Patented Sept. 11, 1951

2,567,544

UNITED STATES PATENT OFFICE 2,567,544

PROCESS FOR THE MANUFACTURE OF SODIUM ALUMINUM FLUORIDE

Erling Brodal and Henning Guldhav, Hoyanger, Norway, assignors to Aktieselskapet Norsk Aluminium Company, Lokkeveien, Norway No Drawing. Application January 31, 1946, Serial No. 644,656. In Norway January 26, 1945

Section 1, Public Law 690, August 8, 1946
Patent expires January 26, 1965

2 Claims. (Cl. 23—88)

The present invention relates to the manufacture of alkali metal-aluminum fluorides, particularly of the cryolite type and has for its object a process by means of which it is made possible by simple means to manufacture such double fluorides practically free from or poor in silica.

In this process the alkali metal aluminum fluorides are produced by reaction between alkali metal fluoride and alkali metal aluminate in aqueous solution.

An important feature of the process according to the invention consists therein that the reaction between the components, alkali metal fluoride and alkali metal aluminate is brought about in the presence of alkali in sufficient quantity to enable the formation of alkali metal aluminum fluorides in alkaline solution, from which the double fluoride can afterwards be precipitated in solid form, subsequent to the removal of suspended solids from the solution by means of filtration or other suitable treatment.

An object of the invention is the manufacture of sodium aluminum fluoride in a high degree of purity from the solid reaction mass obtained by heating fluorspar with alkaline sodium compounds and in the presence of silica as a lime binding agent which comprises lixiviating the reaction mass with an aqueous sodium hydroxide and sodium aluminate solution, wherein the aluminate is in sufficient amount to react with the fluorine present, separating undissolved solids and precipitating sodium aluminum fluoride with a neutralizing reagent.

Other and further objects of the present invention will appear from the more detailed description set forth below, it being understood that such more detailed description is given by way of illustration and explanation only and not by way of limitation.

The removal of undissolved (suspended) matter from the alkaline solution of double fluoride previous to the precipitation of the bulk of double fluoride—by cooling, evaporation, neutralization or other suitable operations—has been found to be of fundamental importance in order to obtain a product poor in silica.

In a suitable embodiment of the process the operations are conducted in such a manner that undissolved fluoride is retained in the liquid after the reaction between fluoride and aluminate. It has been found that the silica present in the reacting solutions will adhere to or combine with such solid fluoride and can be removed from the solution together therewith by filtration or other equivalent treatment.

The alkali metal fluoride (particularly sodium fluoride, $NaF$) necessary for the formation of the double fluoride is suitably produced by alkaline decomposition of fluorspar or like raw material, it having been found that the reaction product obtained in this way is directly applicable as a raw material for the further reaction with alkali metal aluminate. This decomposition of the fluorspar can be brought about by heating the same with alkali, such as soda, to sintering or melting in the presence of lime-binding reaction agents such as silica, iron oxides and the like. By leaching the resulting reaction mass with water or aqueous liquids, solutions are obtained which are suitable for the formation of alkali metal aluminum fluoride by reaction with alkali metal aluminate.

In carrying out the process according to the invention it will be of particular advantage to make use of an alkali metal aluminate solution to lixiviate the fluoride bearing reaction mass (obtained by alkaline decomposition of fluorspar or the like), the formation of alkali metal aluminum fluoride then taking place in the course of the leaching operation. When the lixiviation liquid contains sufficient alkali, it is possible in this manner to obtain directly a solution, from which double fluoride in solid form can be subsequently precipitated, for example by treatment with carbon dioxide or alkali bicarbonate.

The lixiviation of the fluoride bearing reaction mass and the described reaction between fluoride and aluminate is most suitably brought about in a solution containing alkali metal hydroxide. This is the case without regard to the manner in which the fluoride or fluoride solution has been produced.

As above stated, a suitable fluoride material for reacting upon with the alkali metal aluminate consists of the reaction product obtained by heating fluorspar and other like material with alkali (such as soda) and silica (for example quartz or alkali metal aluminum silicate) to melting or sintering temperatures. In this melting or sintering process the alkali and fluorspar may in part or wholly be replaced by the ash constituents of discarded furnace linings from electrolytic furnaces employed in the manufacture of aluminum metal. Such discarded furnace linings may be added directly to the charge comprising alkaline reaction agent in a finely disintegrated condition. Or the linings may first be incinerated and the ash hereby obtained employed as a constituent of the charge to be heated. In this way a complete utilization of all valuable constituents of the said discarded linings and similar waste products can be attained.

By the leaching of "fluoride slag" or "fluoride sinter" in aluminate lye (alkali metal aluminate solution) it has been found that the solubility of the alkali metal fluoride (NaF) is strongly dependent upon the NaOH-concentration. It has been ascertained that the percentage of NaOH should not decrease below a certain limit, if it is desired to obtain a practically complete utilization of soluble NaF in the fluoride slag or sinter. If the percentage of NaOH is below this limit, soluble NaF will under ordinary condition be liable to become converted into an insoluble fluoride compound, containing also aluminum. As a consequence of this the $Al_2O_3$-concentration in the employed aluminate solutions will decrease in the course of the lixiviation operation. The precipitated compound will not under ordinary conditions become redissolved in aluminate solutions, soda solutions or water. But it is soluble in solutions of NaOH.

The lixiviation of the slag in aluminate solution, in order to result in a solution saturated as far as possible with NaF, should preferably be carried out in the presence of an excess of "fluoride slag." This means that an amount of fluoride slag should be added, which corresponds to more NaF than what is possible to dissolve in the aluminate liquor. The sludge may afterwards be treated in an excess of the aluminate liquor.

If it is desired to attain maximum output of soluble NaF in the slag, the excess of slag used in the lixiviation operation will under ordinary conditions also be dependent upon the concentration of NaOH in the solution.

*Examples*

1. To a clear sodium fluoride solution containing silica, is added an alkaline sodium aluminate solution in sufficient quantity to form sodium aluminum fluoride. The concentration of the solution is so adjusted that by the reaction a saturated solution is obtained. By slight cooling a small proportion of solid matter is caused to be precipitated. The solution is thereupon filtered and to the clear solution carbon dioxide gas is thereupon introduced.

The cryolite hereby deposited is separated from the liquid, washed and dried.

2. To a clear sodium fluoride solution is added an alkaline sodium aluminate solution in sufficient quantity to form the desired alkali metal aluminum fluoride.

Carbonic acid gas is thereupon introduced into the solution until precipitation of solid matter begins. Suspended solids are then separated off by filtration, centrifugal separation or by other suitable means. The treatment of the solution with carbonic acid gas is then continued until maximum precipitation of double fluoride is attained. The precipitate is separated off, washed and dried.

3. A fluoride slag obtained by heating fluorspar with silica and soda, is subjected to lixiviation with an alkaline sodium aluminate solution containing sodium hydroxide. The resulting liquid is filtered and into the clear solution is introduced carbon dioxide gas or sodium bicarbonate to precipitate sodium aluminum fluoride.

4. A fluoride reaction mass is produced by smelting a charge containing fluorspar, silica, soda, limestone as well as an aluminum oxide material in sufficient quantity to form sodium aluminum fluoride. The mass is lixiviated with a sodium hydroxide solution. The resulting solution is filtered and into the clear solution carbon dixoide gas is introduced in order to precipitate the double fluoride.

5. An aluminum oxide material containing silica is decomposed by melting with limestone and some soda. The resulting calcium aluminate slag is lixiviated in an alkaline solution under such conditions as to result in an aluminate solution containing sodium hydroxide. This solution is used to react upon alkali fluoride in the manner explained in Examples 1, 2, 3, or 4.

6. A reaction mass containing alkali metal fluoride is subjected to lixiviation in water or aqueous solution. To the resulting solution, which still contains suspended solid matter from the fluoride reaction mass, is added alkaline aluminate solution in sufficient quantity to form alkali aluminum fluoride. The solution is then filtered and thereupon treated with carbon dioxide gas and bicarbonate. The precipitated double fluoride is separated off, washed and dried.

7. A mixture of 100 kg. of fluorspar (analysis: 80% $CaF_2$, 8% $SiO_2$, 10% $CaCO_3$), 30 kg. of quartz and 90 kg. of calcined soda, is ground to 150 mesh and is heated to fusion temperature for about one hour (at about 750° C.). The sinter is cooled and crushed to 100 mesh and thereupon lixiviated in 1000 l. of water containing 10 g. of soda per liter. The lixiviation takes place at a temperature of about 45° C. for about one hour. Undissolved matter is filtered off and to the solution, which now contains 40 grams per liter NaF besides NaOH and $Na_2CO_3$, is added an equivalent amount of aluminate solution to form $Na_3AlF_6$. One has obtained for example 1900 liters of solution containing 40 grams per liter NaF and has at one's disposal an aluminate solution containing 13 grams per liter $Al_2O_3$. The required amount of aluminate solution then is 1150 liters, in that an amount containing preferably a little less than the theoretically equivalent quantity of aluminate is employed in order to avoid $Al_2O_3$ in the cryolite to be precipitated.

When the aluminate solution has been added to the fluoride solution, there will at the prevailing concentration be precipitated a small quantity of cryolite. This cryolite, which will contain the main part of silica present, is filtered off. After calcination this product can be employed with advantage in electrolysation furnaces for Si-Al-alloys.

To precipitate the remaining sodium aluminum fluoride, the alkali present in the solution is converted into $NaHCO_3$ by the introduction of carbon dioxide gas. For this purpose a gas containing for example about 10 per cent $CO_2$ may be used. The solution may have a temperature of about 45° C. The precipitated cryolite is filtered off and calcined.

8. The operations are carried out substantially as described in Example 7, but with the difference that the lixiviation of the fluoride mass obtained by the fluorspar decomposition is effected by means of a solution containing 3 g. of free NaOH per liter.

9. A fluoride slag produced by alkaline decomposition of fluorspar is lixiviated in a sodium aluminate solution obtained by alkaline decomposition of aluminum oxide material containing silica. The fluoride slag was composed as follows:

Per cent of total F_____ 19.-
Per cent of total $Na_2O$_____ 30.7
Per cent of soluble F_____ 15.1
Per cent of soluble $Na_2O$_____ 25.8
Per cent CaO_____ 30.4
Per cent $SiO_2$_____ 22.9

The aluminate solution had the following composition:

6.5 g./l. $Na_2O.Al_2O_3$
3.- g./l. NaOH
9.5 g./l. $Na_2CO_3$
0.2 g./l. $Na_2SiO_3$ 12,000 kg. fluoride slag was lixiviated at 40–45° C. in 200 cubic meters aluminate solution for 3 hours while being stirred. The sludge was filtered off and washed with water. Filtrate together with wash water, amounting to 300 cubic meters contained after the leaching operation 9.6 kilograms per cubic meter fluorine and 0.05 kilograms per cubic meter $SiO_2$ in solution. Into this solution was passed a gas containing 10 per cent $CO_2$ until about 60 per cent of alkali present had been converted into bicarbonate. The precipitated alkali metal aluminum fluoride was filtered off, washed with water and dried. The filtrate contained 0.45 kilograms per cubic meter of fluorine.

The dried alkali metal aluminum fluoride had a weight of 3440 kg. and was composed as follows:

91.8% $Na_3AlF_6$
3.5% NaF
1.3% $Al_2O_3$
0.1% $SiO_2$
Traces of $Fe_2O_3$
3.5% total $H_2O$ 10. A fluoride slag of the same composition as in Example 9 was employed, but the aluminate solution had the following analysis:

8.1 g./l. $Na_2O.Al_2O_3$
3.5 g./l. NaOH
8.6 g./l. $Na_2CO_3$
0.2 g./l. $SiO_2$ 17,000 kg. of the fluoride slag was leached in 200 cubic meters aluminate solution under the same conditions as in Example 9, but only for about one hour and a half. The sludge was filtered off and further leached in 195 cubic meters of alkali aluminate solution of the same composition and under the same conditions as in the leaching of the initial fluoride slag. The remaining sludge was then filtered off and washed with water. In the filtrate plus wash waters in total 200 cubic meters, was contained 2 grams per liter F. This solution was used to leach a suitable quantity of fluoride slag to form an alkali metal aluminate solution contained 11 grams per liter F.

The solution after the fluoride slag leaching contained 11.12 kilograms per cubic meter F. The alkali metal aluminum fluoride was precipitated as in Example 9, filtered off, washed and dried. The weight of the dried cryolite was 4160 kg. The composition of the cryolite was about the same as in Example 9.

11. Discarded furnace linings and like waste material from furnaces employed for the manufacture of aluminum are utilized to produce the fluoride to be reacted upon by alkali metal aluminate solutions.

Such waste materials substantially consist of carbon, but contain substantial amounts of alkali and fluorine. The discarded linings are incinerated and the ash treated with alkali and silica.

An ash having the following composition was treated:

15% F
21% $Al_2O_3$
50% $Na_2O$
1.5% CaO
3.0% $Fe_2O_3$ 10 per cent of the soda in a charge of fluorspar, silica and soda composed to produce a fluoride slag by heating is introduced in the form of an ash of the above composition.

The charge was composed as follows:

1000 kg. of fluorspar
1040 kg. of soda
280 kg. of ash
420 kg. of quartz

The mixture was fused in an electric furnace. The resulting reaction mass was cooled and crushed to 200 mesh. There is obtained 2250 kg. fluoride slag, containing 21.3% F. The slag is leached with 45 cubic meters alkali metal aluminate solution, containing:

6.5 g./l. $Na_2O.Al_2O_3$
3.5 g./l. NaOH
12.0 g./l. $Na_2CO_3$

The leaching is carried out at about 40° C. for one hour. The sludge is filtered off and the clear solution is supplied with carbon dioxide gas until about 50% of dissolved alkali has been converted to $NaHCO_3$. The precipitated cryolite is filtered off and calcined.

12. The operations are carried out substantially in the same manner as described in the above examples. The fluoride solution is produced by leaching a reaction mass obtained by heating a charge of fluorspar, silica and soda, to which has been added a substantial proportion of discarded furnace linings in a disintegrated condition.

In the Examples 9 and 10 the lixiviation of the fluoride slags has been effected by means of solutions containing 3–3.5 g. of NaOH per liter. The amount of free NaOH in the solution may, however, with advantage be considerably larger, in that it has been found that the completeness of the lixiviation increases with increasing percentage of NaOH in the lixiviation liquid.

The processes described in the examples are with particular advantage carried out in direct cooperation with the manufacture of alumina by the use of alkaline decomposition agents.

The described processes are capable of being modified within wide limits within the scope of the present invention. The invention also comprises a method for the purification of alkali metal aluminum fluoride containing silica without regard to its origin or to the method by means of which it has been produced.

The essential feature of such a process consists in adding an undissolved (solid) fluorine compound, such as aluminium fluoride, cryolite, fluorspar or the like to an alkaline solution of the impure alkali metal aluminum fluoride or of its components or by causing the formation of such undissolved (solid) fluoride in the said alkaline solution, whereupon the introduced or formed undissolved (solid) matter is removed from the solution by filtration or by other suitable means, so as to obtain a clear solution. From this clear solution the double fluoride can thereafter be precipitated in a solid condition, for example by a more or less complete neutralization by means of carbon dioxide or a bicarbonate.

What is claimed is:

1. A process for the manufacture of sodium aluminum fluoride starting from a solid reaction mass obtained by heating fluorspar with alkaline sodium compounds in the presence of silica as a lime binding agent comprising the steps of lixiviating the solid reaction mass of fluorspar, silica and alkaline sodium compound with an aqueous liquid initially containing sodium hydroxide and containing sodium aluminate, said aluminate being in sufficient amount to react with all of the fluorine present, separating undissolved solid materials to form a clear solution and precipitating sodium aluminum fluoride by means of a neutralizing agent.

2. A process according to claim 1 in which the solution of sodium aluminate employed as the lixiviation agent contains a minimum concentration of about 3 grams of sodium hydroxide per liter of lixiviating solution.

ERLING BRODAL.
HENNING GULDHAV.

REFERENCES CITED

The following references are of record in the file of this patent:

UNITED STATES PATENTS

| Number | Name | Date |
|---|---|---|
| 1,960,986 | Beja | May 29, 1934 |
| 2,196,077 | Morrow | Apr. 2, 1940 |
| 2,210,594 | Morrow | Aug. 6, 1940 |
| 2,365,702 | Hignett | Dec. 26, 1944 |

FOREIGN PATENTS

| Number | Country | Date |
|---|---|---|
| 487,021 | Great Britain | Oct. 21, 1937 |